(12) United States Patent
Yamauchi et al.

(10) Patent No.: US 11,549,535 B2
(45) Date of Patent: Jan. 10, 2023

(54) JOINED BODY, AUTOMOBILE SEAT FRAME, AND JOINING METHOD

(71) Applicant: NHK Spring Co., Ltd., Yokohama (JP)

(72) Inventors: Yuichiro Yamauchi, Kanagawa (JP); Ayane Sato, Kanagawa (JP); Katsuji Goto, Kanagawa (JP); Masakazu Ando, Kanagawa (JP); Takuya Sato, Kanagawa (JP); Yu Yoda, Kanagawa (JP); Shimpei Kurokawa, Kanagawa (JP); Masatake Kinoshita, Kanagawa (JP)

(73) Assignee: NHK Spring Co., LTD., Yokohama (JP)

( * ) Notice: Subject to any disclaimer, the term of this patent is extended or adjusted under 35 U.S.C. 154(b) by 615 days.

(21) Appl. No.: 16/605,353

(22) PCT Filed: Apr. 3, 2018

(86) PCT No.: PCT/JP2018/014337
§ 371 (c)(1),
(2) Date: Oct. 15, 2019

(87) PCT Pub. No.: WO2018/193839
PCT Pub. Date: Oct. 25, 2018

(65) Prior Publication Data
US 2020/0124069 A1 Apr. 23, 2020

(30) Foreign Application Priority Data

Apr. 19, 2017 (JP) .............................. JP2017-083196
Oct. 3, 2017 (JP) ................................ 2017-193885

(51) Int. Cl.
*F16B 5/08* (2006.01)
*B60N 2/68* (2006.01)
(Continued)

(52) U.S. Cl.
CPC ................ *F16B 5/08* (2013.01); *B23K 11/11* (2013.01); *B60N 2/682* (2013.01); *F16B 5/04* (2013.01)

(58) Field of Classification Search
CPC ............ B23K 11/0026; B23K 11/0046; B23K 11/0066; B23K 11/11; B23K 11/20;
(Continued)

(56) References Cited

U.S. PATENT DOCUMENTS 9,751,571 B2    9/2017  Iwase et al.
2009/0294410 A1* 12/2009 Iwase ..................... B21J 15/025
                                                         219/91.23

FOREIGN PATENT DOCUMENTS

JP    2010-207898 A    9/2010
JP    2014-121710 A    7/2014
(Continued)

OTHER PUBLICATIONS

International Search Report dated Jun. 12, 2018, issued for PCT/JP2018/014337.

*Primary Examiner* — Dana Ross
*Assistant Examiner* — James F Sims, III
(74) *Attorney, Agent, or Firm* — Locke Lord LP

(57) ABSTRACT

A joined body includes: a thin plate including through holes; a first member including a proximal portion having a portion contacting the thin plate, and a protruding portion that protrudes in relation to a contact surface of the proximal portion and is inserted through the through hole; and a second member arranged oppositely to the proximal portion via the thin plate and made of a material that is same as that of the first member. The thin plate is made of a material having a specific gravity smaller than that of the material forming the first and the second members. The second member and an end portion of the protruding portion are connected to each other, by a part of the second member and (Continued)

a part of the end portion being melt-solidified, the end portion being at a side opposite to a side connected to the proximal portion.

6 Claims, 17 Drawing Sheets

(51) Int. Cl.
  *F16B 5/04* (2006.01)
  *B23K 11/11* (2006.01)
(58) Field of Classification Search
  CPC .......... B23K 2101/006; B23K 2101/04; B23K 2101/18; B23K 2103/20; B60N 2/682; F16B 5/04; F16B 5/08
  USPC ........................................................ 403/272
  See application file for complete search history.

(56) References Cited

FOREIGN PATENT DOCUMENTS

| | | |
|---|---|---|
| JP | 2015-164840 A | 9/2015 |
| JP | 2015-167972 A | 9/2015 |
| JP | 2016-056952 A | 4/2016 |

\* cited by examiner (a)          (b)

JOINED BODY, AUTOMOBILE SEAT FRAME, AND JOINING METHOD

FIELD

The present invention relates to a joined body, an automobile seat frame, and a joining method for the joined body.

BACKGROUND

For the purpose of weight reduction of various parts used in automobiles, replacement of iron-based materials to aluminum-based materials has been investigated in recent years. While aluminum-based materials are suitable for weight reduction, if all iron-based materials are replaced with aluminum-based materials, sufficient product strength is difficult to be obtained. Partial replacement of iron-based materials to aluminum-based materials has thus been investigated. When iron-based materials are partially replaced with aluminum-based materials, joining between an iron-based material and an aluminum-based material is needed.

Various techniques, which are for reduction of generation of intermetallic compounds that cause reduction of joint strength when iron-based materials and aluminum-based materials are joined to each other by welding, have been proposed (see, for example, Patent Literature 1). According to Patent Literature 1, after a part of a rivet is caused to penetrate an aluminum-based material by the rivet being pressed onto the aluminum-based material, the rivet and an iron-based material are spot-welded together.

CITATION LIST

Patent Literature

Patent Literature 1: Japanese Unexamined Patent Application, Publication No. 2016-056952

SUMMARY

Technical Problem

For automobile seat frames, a technique, which is for ensuring strength of a seat frame by joining a pipe member made of an iron-based material to a plate-like panel made of an aluminum-based material, has been adopted. However, this joining technique disclosed in Patent Literature 1 requires large electric current for obtaining sufficient joint strength because flow of electric current for welding is split as the electric current is conducted to the aluminum-based material when the rivet is caused to penetrate the aluminum-based material. Furthermore, when the aluminum-based material has an insulating coating or the like thereon, the insulating coating is peeled off when the rivet penetrates the aluminum-based material, electric corrosion is caused between the rivet and the aluminum-based material, and as a result, strength of the joint is reduced. Moreover, according to Patent Literature 1, there is a problem that the step for causing the rivet to penetrate the aluminum-based material is needed and the operation man-hour is increased. Therefore, the joining technique disclosed in Patent Literature 1 is not suitable for joining a plate-like member and a pipe-like member to each other.

The present invention has been made in view of the above, and an object thereof is to provide a joined body, an automobile seat frame, and a joining method, which: enable a plate-like member and a pipe-like member to be joined strongly to each other; and enable weight reduction.

Solution to Problem

To solve the above-described problem and achieve the object, a joined body according to the present invention includes: a thin plate including through holes formed along an outer periphery thereof; a first member including a proximal portion having a portion contacting the thin plate, and a protruding portion that protrudes in relation to a contact surface of the proximal portion and is inserted through the through hole, the contact surface contacting the thin plate; and a second member arranged oppositely to the proximal portion via the thin plate and made of a material that is same as that of the first member, wherein the thin plate is made of a material having a specific gravity smaller than that of the material forming the first member and the second member, and the second member and an end portion of the protruding portion are connected to each other, by a part of the second member and a part of the end portion being melt-solidified, the end portion being at a side opposite to a side connected to the proximal portion.

Moreover, in the joined body according to the above-described invention, a relationship represented by $D_C < D_A < D_B$ is satisfied, where a diameter of the through holes is $D_A$, a diameter of the proximal portion is $D_B$, and a diameter of the protruding portion is $D_C$.

Moreover, in the joined body according to the above-described invention, at least a surface of the thin plate is formed of an insulating material.

Moreover, in the joined body according to the above-described invention, a surface of the joined body includes an insulating coating formed thereon.

Moreover, in the joined body according to the above-described invention, the thin plate is made of aluminum or aluminum alloy, and the second member and the first member are made of iron or iron alloy.

Moreover, an automobile seat frame according to the present invention includes the joined body according to the above-described invention.

Moreover, a joining method according to the present invention includes: an abutting step of: inserting protruding portions of first members each including a proximal portion and a protruding portion protruding in relation to the proximal portion, respectively through the through holes formed in a thin plate made of a material having a specific gravity smaller than that of a material forming the first members; and causing end portions of the protruding portions to abut a second member made of a material that is same as that of the first member, the end portions being at sides opposite to sides connected to the proximal portions; and a joining step of joining parts of the second member with parts of the end portions of the protruding portions by resistance spot welding in a state where the second member has abutted the end portions of the protruding portions, the end portions being at the sides opposite to the sides connected to the proximal portions.

Advantageous Effects of Invention

The present invention has an effect of: enabling a plate-like member and a pipe-like member to be joined strongly to each other; and enabling weight reduction.

DESCRIPTION OF EMBODIMENTS

Hereinafter, embodiments of the present invention will be described in detail, together with the drawings. The present invention is not limited by the following embodiments. Furthermore, the drawings referred to in the following description illustrate shapes, sizes, and positional relations merely schematically so as to enable subject matter of the present invention to be understood. That is, the present invention is not limited only to the shapes, sizes, and positional relations exemplified by the drawings.

First Embodiment

Figure 1:
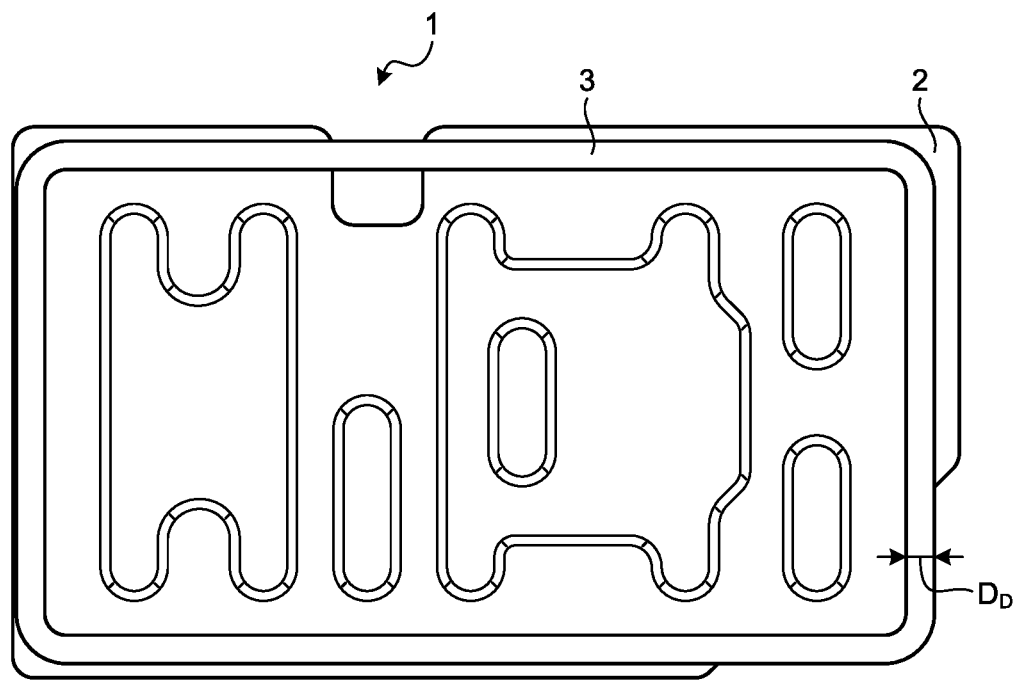
FIG. 1 is a front view of an automobile seat frame according to a first embodiment of the present invention.
Figure 2:
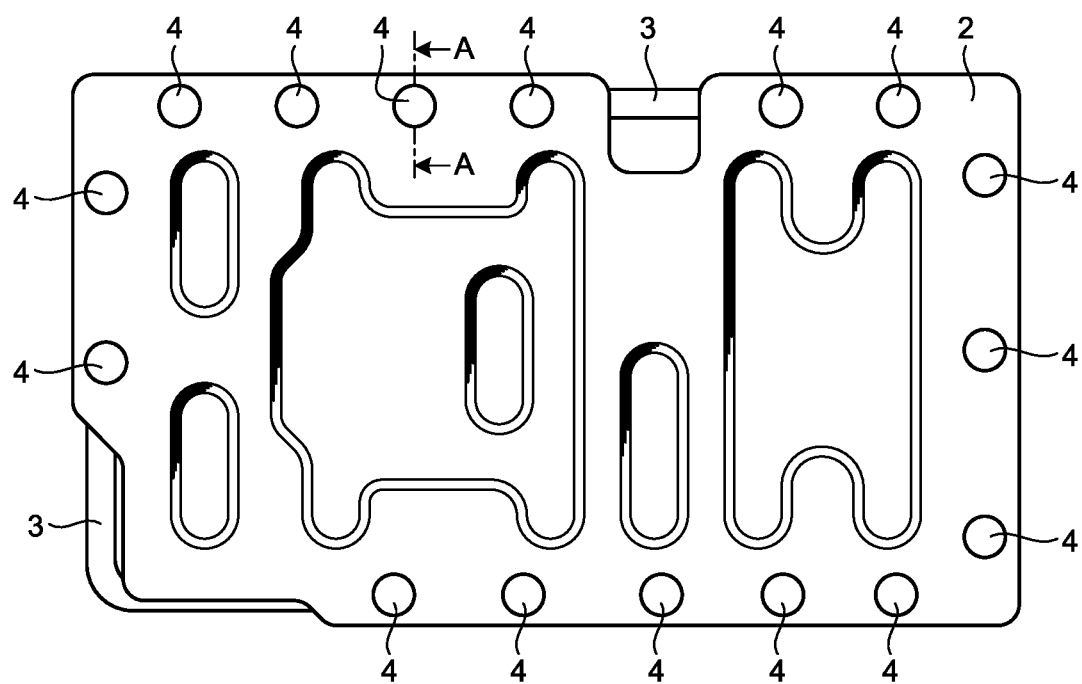
FIG. 2 is a rear view of the automobile seat frame in FIG. 1.
Figure 3:
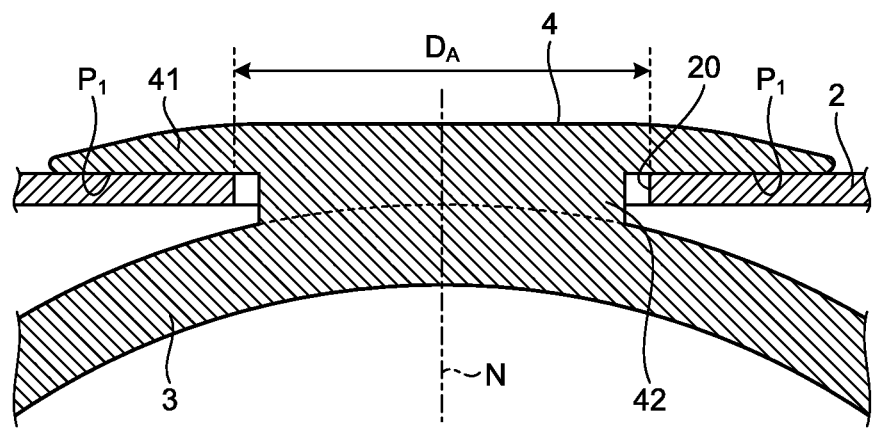
FIG. 3 is a partial enlarged sectional view taken along a line A-A in FIG. 2.

First of all, an automobile seat frame according to a first embodiment of the present invention will be described in detail by reference to the drawings. FIG. 1 is a front view of the automobile seat frame according to the first embodiment of the present invention. FIG. 2 is a rear view of the automobile seat frame in FIG. 1. FIG. 3 is a partial enlarged sectional view taken along a line A-A in FIG. 2.

An automobile seat frame 1 includes: a back panel 2 made of aluminum or aluminum alloy; a frame pipe 3 made of iron or iron-based alloy; and fastening pins 4 that fasten the back panel 2 and the frame pipe 3 together. In the automobile seat frame 1, the frame pipe 3 is fixed to the back panel 2, by the fastening pins 4 and the frame pipe 3 being joined to each other in a state where the fastening pins 4 have penetrated the back panel 2.

Figure 4:
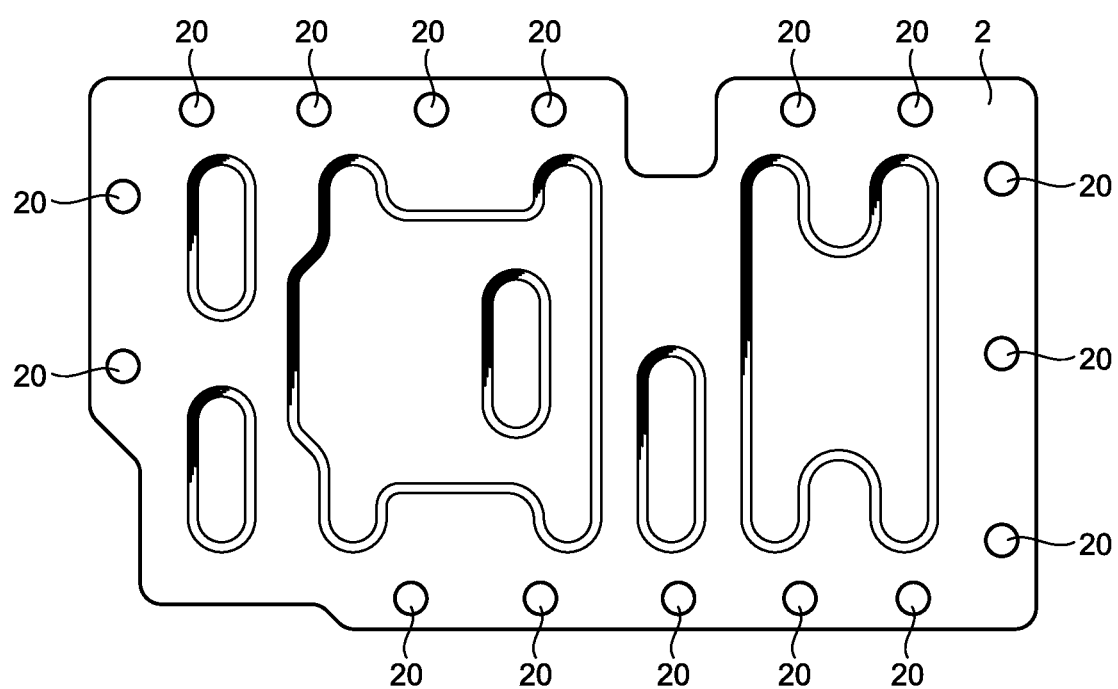
FIG. 4 is a rear view illustrating a configuration of a back panel of the automobile seat frame according to the first embodiment of the present invention.

FIG. 4 is a rear view illustrating a configuration of a back panel of the automobile seat frame according to the first embodiment of the present invention. The back panel 2 is a thin plate made of aluminum or aluminum alloy, and is formed by press working or the like. The aluminum alloy is preferably high in strength, and for ease of press working or the like, a 5000 series (Al—Mg series) aluminum alloy, a 6000 series (Al—Mg—Si series) aluminum alloy, or a 7000 series (Al—Zn—Mg series) aluminum alloy is preferably used.

The back panel 2 has plural through holes 20 penetrating the back panel 2 in a plate thickness direction thereof and formed along an outer periphery of the back panel 2. The through holes 20 are preferably formed simultaneously upon press working for formation of an external form of the back panel 2, for simplification of the manufacturing process.

The frame pipe 3 is a pipe, which has a circular cross-sectional shape and is made of iron or iron-based alloy. Soft steel having a tensile strength equal to or greater than 270 MPa and equal to or less than 1600 MPa, carbon steel, high tensile strength steel, ultrahigh tensile strength steel, stainless steel, or the like may be used as the iron-based alloy. For improvement of strength of the automobile seat frame 1, the frame pipe 3 is preferably formed of high tensile strength steel. The frame pipe 3 may have a rectangular or polygonal cross-sectional shape. The frame pipe 3 may be a solid or plate-like frame.

Figure 5:
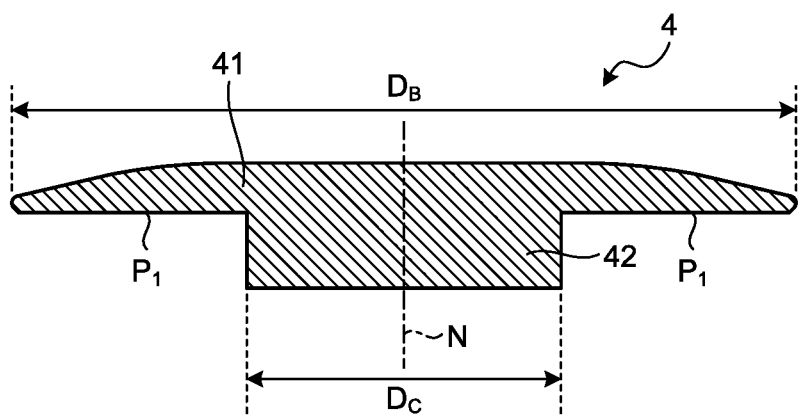
FIG. 5 is a sectional view illustrating a configuration of a fastening pin of the automobile seat frame according to the first embodiment of the present invention.

FIG. 5 is a sectional view illustrating a configuration of a fastening pin of the automobile seat frame according to the first embodiment of the present invention. FIG. 3 illustrates the fastening pin 4 after being joined to the frame pipe 3, and FIG. 5 illustrates the fastening pin 4 before being fastened to the frame pipe 3. The fastening pin 4 has a head portion 41 having a flat plate shape, and a shaft portion 42 extending cylindrically from a central portion of the head portion 41. The shaft portion 42 has a shape protruding in relation to a contact surface $P_1$ of the head portion 41, the contact surface $P_1$ contacting the back panel 2. The fastening pin 4 is formed by use of a material that is the same as that of the frame pipe 3, for example, iron or iron-based alloy mentioned above. In the fastening pin 4, the head portion 41 corresponds to a proximal portion, and the shaft portion 42 corresponds to a protruding portion.

According to this first embodiment, where a diameter of the through holes 20 of the back panel 2 is $D_A$, a diameter of the head portion 41 of the fastening pin 4, the diameter being vertical to an axis N of the fastening pin 4, is $D_B$, a diameter of the shaft portion 42 of the fastening pin 4, the diameter being vertical to the axis N, is $D_C$, and a diameter of the frame pipe 3 is $D_D$; the diameters $D_A$ to $D_D$ have relations, $D_C<D_A<D_B$ and $D_A<D_D$. For example, the diameter $D_A$ and the diameter $D_B$ have a relation, $1.5 \leq D_B/D_A \leq 2.5$. In a state where the frame pipe 3 and the fastening pin 4 have been joined to each other, the shaft portion 42 and an inner wall of the through hole 20 are separate from each other (see FIG. 3). Furthermore, the back panel 2 and the contact surface $P_1$ of the head portion 41 are in contact with each other.

The fastening pin 4 may have a recessed portion formed on a surface of the head portion 41, the surface contacting the back panel 2. By the formation of this recessed portion, weight of the fastening pin 4 is able to be reduced.

Figure 6A:
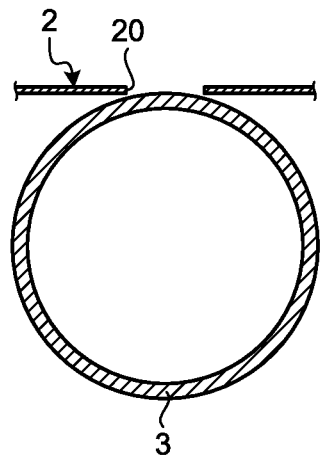
FIG. 6A is a diagram illustrating (a first part of) a joining method for the automobile seat frame according to the first embodiment of the present invention.
Figure 6B:
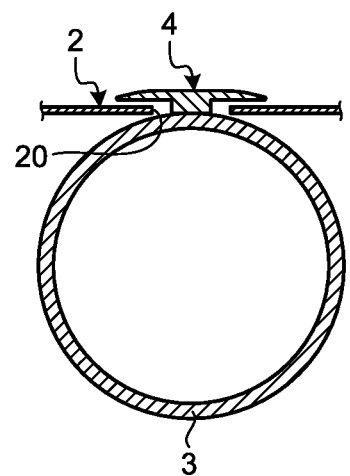
FIG. 6B is a diagram illustrating (a second part of) the joining method for the automobile seat frame according to the first embodiment of the present invention.
Figure 6C:
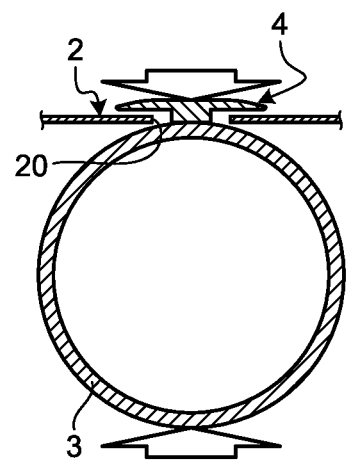
FIG. 6C is a diagram illustrating (a third part of) the joining method for the automobile seat frame according to the first embodiment of the present invention.

Next, a method of joining the fastening pin 4 and the frame pipe 3 to each other will be described by reference to FIG. 6A to FIG. 6C. FIG. 6A to FIG. 6C are diagrams illustrating a joining method for the automobile seat frame according to the first embodiment of the present invention. Firstly, as illustrated in FIG. 6A, correspondingly to the through holes 20, the frame pipe 3 is arranged on the back panel 2 having the through holes 20 formed therein beforehand.

After the frame pipe 3 is arranged on the back panel 2, as illustrated in FIG. 6B, the shaft portion 42 of the fastening pin 4 is inserted through the through hole 20 and caused to abut the frame pipe 3 (abutting step). In states of FIG. 6A and FIG. 6B, positions of the frame pipe 3 and fastening pin 4 have been fixed by use of a jig not illustrated in the drawings, the positions being relative to the back panel 2. Before the arrangement of the frame pipe 3, the fastening pin 4 may be inserted through the through hole 20.

Thereafter, by the frame pipe 3 and the fastening pin 4 being sandwiched and electrified by two electrodes in a radial direction of the frame pipe 3, resistance spot welding is performed (see FIG. 6C: joining step), and a boundary portion where the frame pipe 3 and the fastening pin 4 abut each other is melt-solidified. A joined body as illustrated in FIG. 3 is thereby able to be obtained. Furthermore, by the resistance spot welding of the frame pipe 3 and fastening pin 4 that are made of the same material, generation of intermetallic compounds is able to be reduced.

Figure 7:
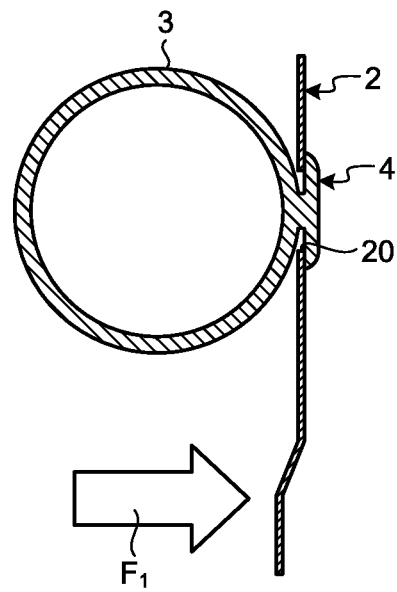
FIG. 7 is a diagram illustrating a load applied to the automobile seat frame according to the first embodiment of the present invention.
Figure 8:
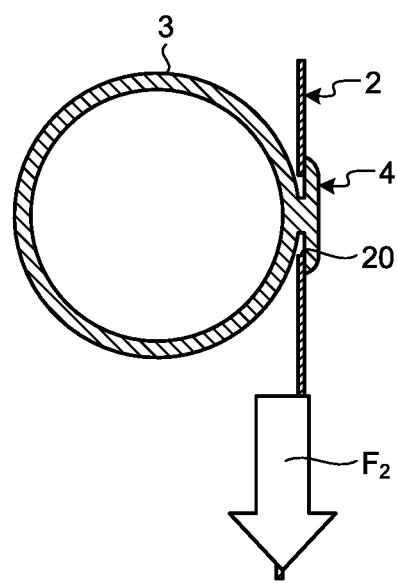
FIG. 8 is a diagram illustrating a load applied to the automobile seat frame according to the first embodiment of the present invention.

FIG. 7 and FIG. 8 are diagrams illustrating loads applied to the automobile seat frame according to the first embodiment of the present invention. The automobile seat frame 1 joined as described above has both: endurance strength against a load in the plate thickness direction of the back panel 2 (hereinafter, referred to as a load $F_1$ in a peeling direction); and endurance strength against a load in a direction parallel to a plate surface of the back panel 2 (hereinafter, referred to as a load $F_2$ in a shearing direction).

According to the above described first embodiment, by resistance spot welding being performed in the state where the shaft portion 42 of the fastening pin 4 has been inserted through the through hole 20 of the back panel 2 and has abutted the frame pipe 3 at a side opposite to a head portion 41 side of the shaft portion 42, the automobile seat frame 1 having the mechanically fastened frame pipe 3 and head portion 41 sandwiching the back panel 2 is able to be manufactured. According to the first embodiment, a plate-like member and a pipe-like member are able to be joined strongly to each other and weight reduction is enabled, by joining strength being ensured through reduction of generation of intermetallic compounds by means of resistance spot welding.

In addition to welding, metal inert gas (MIG) brazing, and laser brazing; a fixing method by use of rivets has been known conventionally. For example, in a case where the back panel 2 and the frame pipe 3 according to this embodiment are attempted to be fixed by use of rivets, after through holes are formed by the rivets in a back panel not having the through holes 20 formed therein, joining is performed by resistance spot welding or the like. In this case, by boring with the rivets, shaft portions of the rivets meet the back panel so as to be in close contact with the back panel, and thus electric current is split upon the resistance spot welding and proper joining may be not achieved.

According to the above description of the first embodiment, the shaft portion 42 and the inner wall of the through hole 20 are separate from each other, but a part of the shaft portion 42 and a part of the inner wall of the through hole 20 may be in contact with each other.

First Modification of First Embodiment

Figure 9:
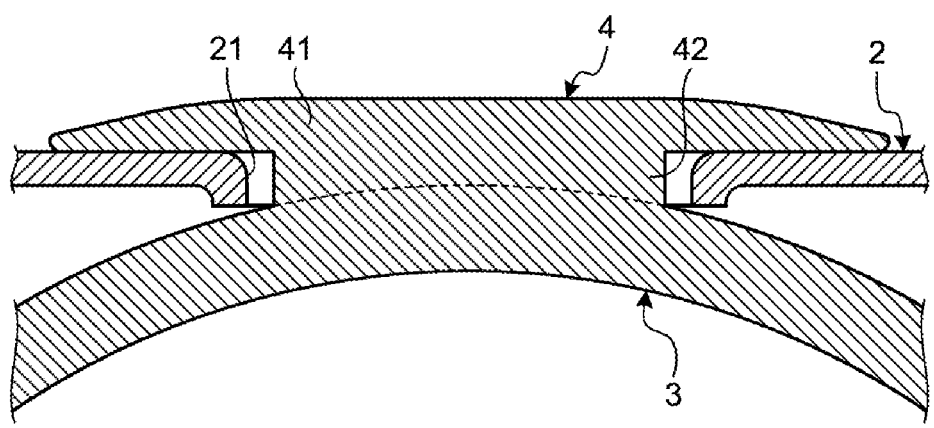
FIG. 9 is a partial enlarged sectional view of an automobile seat frame according to a first modification of the first embodiment of the present invention.

FIG. 9 is a partial enlarged sectional view of an automobile seat frame according to a first modification of the first embodiment of the present invention. A through hole 21 of a back panel 2 according to the first modification is formed such that a rim of the through hole 21 is bent in a penetrating direction of the through hole 21. Even if a clearance is generated in the through hole 21 between the back panel 2 and the frame pipe 3, the rim of the through hole 21 and the frame pipe 3 will contact each other, and wobbling of the frame pipe 3 relative to the back panel 2 is thus able to be reduced.

Second Modification of First Embodiment

Figure 10:
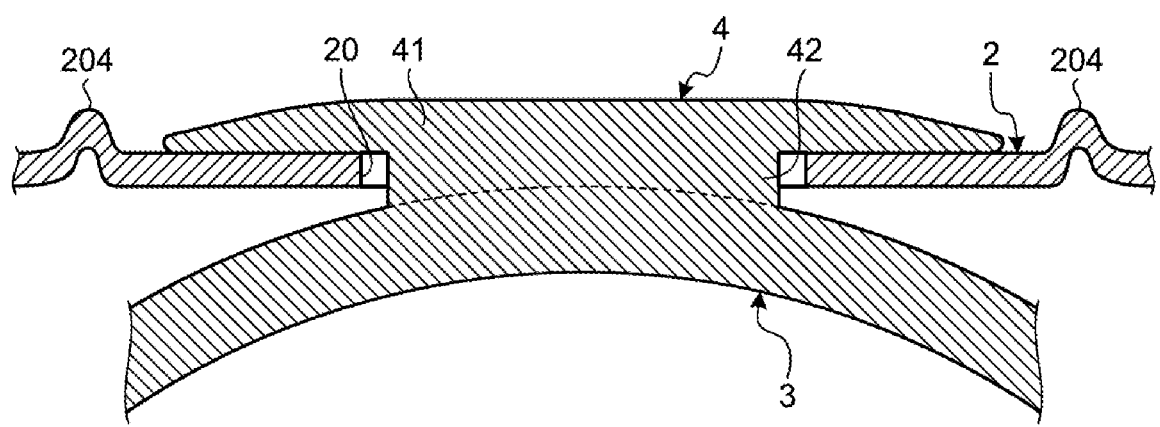
FIG. 10 is a partial enlarged sectional view of an automobile seat frame according to a second modification of the first embodiment of the present invention.

FIG. 10 is a partial enlarged sectional view of an automobile seat frame according to a second modification of the first embodiment of the present invention. A back panel 2 according to the second modification has a protruding portion 204 surrounding the circumference of the head portion 41 of the fastening pin 4. The protruding portion 204 is formed by embossing. By the provision of this protruding portion 204, strength of the back panel 2 around the through hole 20 is able to be improved.

Third Modification of First Embodiment

Figure 11:
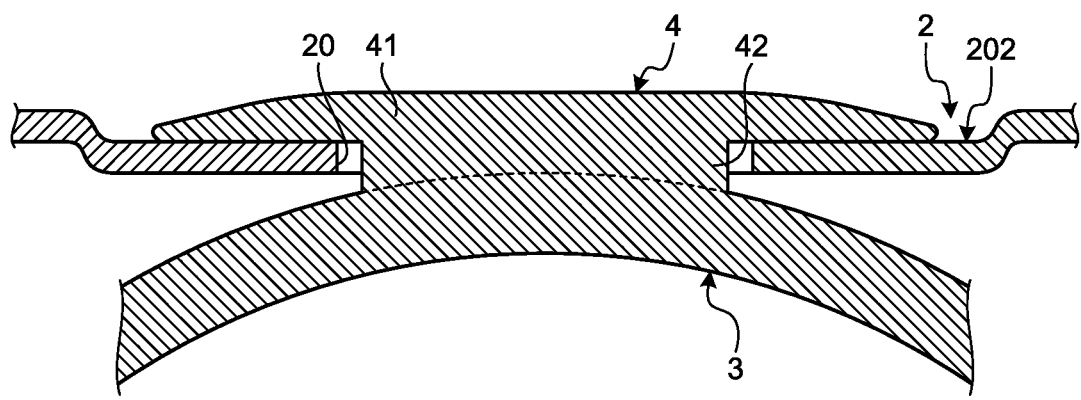
FIG. 11 is a partial enlarged sectional view of an automobile seat frame according to a third modification of the first embodiment of the present invention.

FIG. 11 is a partial enlarged sectional view of an automobile seat frame according to a third modification of the first embodiment of the present invention. A back panel 2 according to the third modification has a recessed portion 202 accommodating the head portion 41 of the fastening pin 4. The recessed portion 202 is formed by embossing. A through hole 20 is formed at the center of the recessed portion 202. By the provision of this recessed portion 202, strength of the back panel 2 around the through hole 20 is able to be improved, and protrusion of the fastening pin 4 from a surface of the back panel 2 is able to be reduced.

Fourth Modification of First Embodiment

Figure 12:
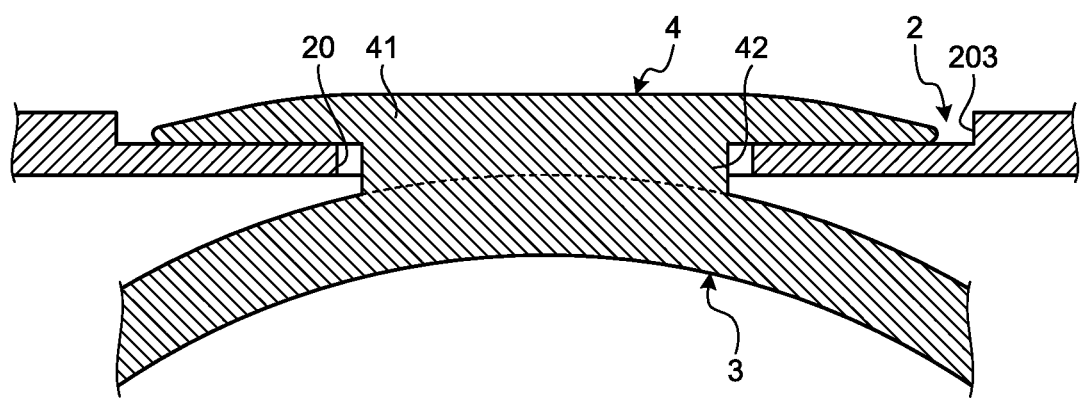
FIG. 12 is a partial enlarged sectional view of an automobile seat frame according to a fourth modification of the first embodiment of the present invention.

FIG. 12 is a partial enlarged sectional view of an automobile seat frame according to a fourth modification of the first embodiment of the present invention. A back panel 2 according to the fourth modification has a notch 203 accommodating the head portion 41 of the fastening pin 4. The notch 203 is formed by a part of a surface of the back panel 2 being scraped off. A through hole 20 is formed at the center of the notch 203. By the provision of this notch 203, protrusion of the fastening pin 4 from the surface of the back panel 2 is able to be reduced, and protrusion of the back panel 2 on a reverse surface of the back panel 2 is able to be prevented.

Fifth Modification of First Embodiment

Figure 13:
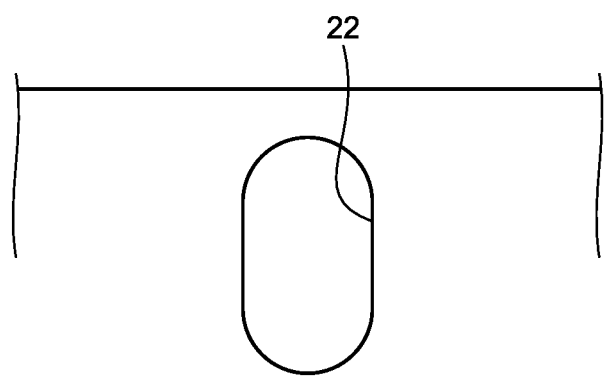
FIG. 13 is a partial enlarged view of a back frame of an automobile seat frame according to a fifth modification of the first embodiment of the present invention.

FIG. 13 is a partial enlarged view of a back panel of an automobile seat frame according to a fifth modification of the first embodiment of the present invention. According to the above description of the embodiment, the through hole 20 has a circular opening, but like in this fifth modification, a through hole 22 having an opening forming an elongated hole extending to an edge side may be provided instead.

Sixth Modification of First Embodiment

Figure 14:
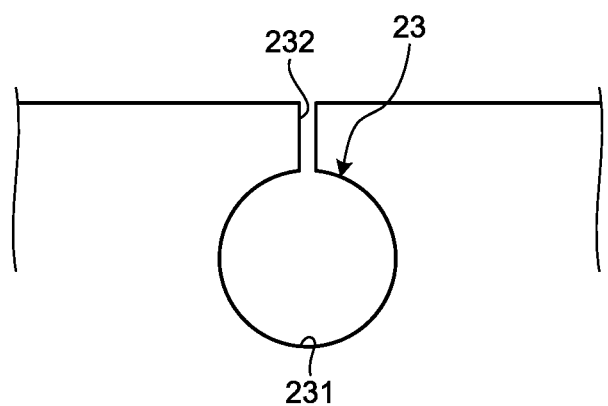
FIG. 14 is a partial enlarged view of a back panel of an automobile seat frame according to a sixth modification of the first embodiment of the present invention.

FIG. 14 is a partial enlarged view of a back panel of an automobile seat frame according to a sixth modification of the first embodiment of the present invention. A through hole 23 according to this sixth modification has an opening that is circular, and has a first penetrating portion 231 penetrating in a plate thickness direction and a second penetrating portion 232 extending to an edge of a back panel 2 from the first penetrating portion 231. Like the through hole 23 according to this sixth modification, a part of the opening may have a notched shape.

The above described fifth and sixth modifications are each just an example of modifications of a through hole, and as long as the fastening pin 4 is able to be inserted therethrough, a through hole may have any other shape.

Seventh Modification of First Embodiment

Figure 15:
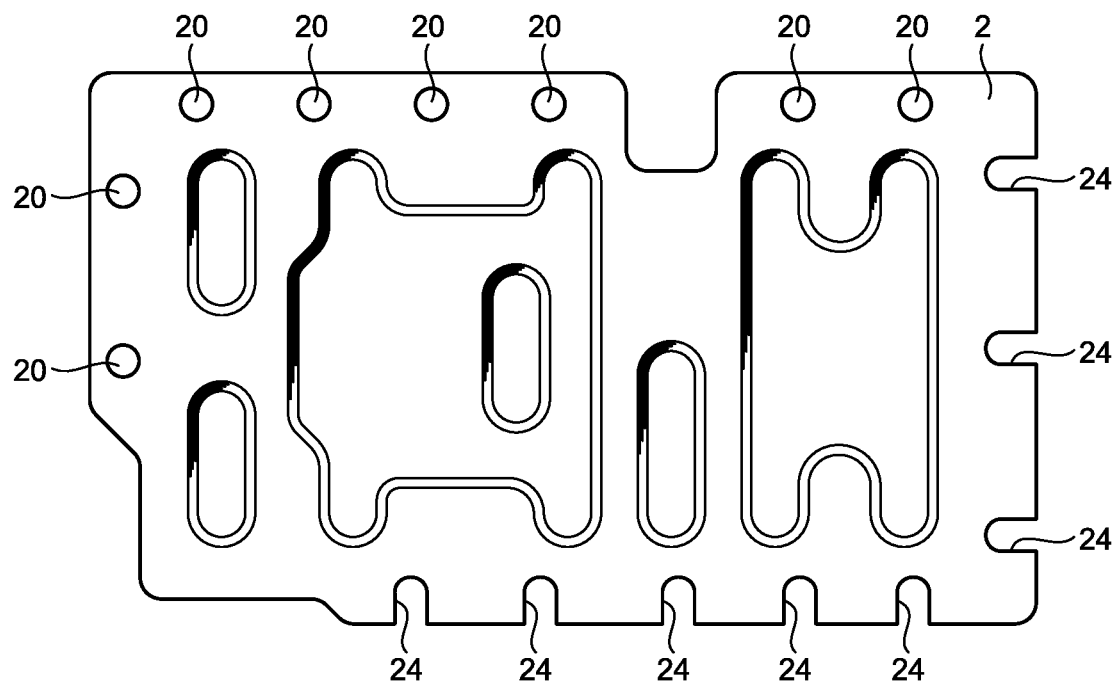
FIG. 15 is a rear view of a back panel of an automobile seat frame according to a seventh modification of the first embodiment of the present invention.

FIG. 15 is a rear view of a back panel of an automobile seat frame according to a seventh modification of the first embodiment of the present invention. A back panel 2 according to this seventh modification has, formed therein, the above described through holes 20, and through holes 24 each penetrating the back panel 2 in a plate thickness direction and each having one end reaching to an edge of the back panel 2. The through holes 20 and the through holes 24 are respectively provided on a pair of opposite sides of through hole formation positions forming a rectangle. According to this seventh modification, even if positional displacement, which is caused by a thermal expansion difference between the pipe and the back panel 2 due to heating in spot welding, occurs, that error is able to be absorbed by the through holes 24. Even if the installation position of the frame pipe 3 is displaced by manufacturing error or the like, manufacture of the above described automobile seat frame 1 is thereby made possible.

At least a portion of the back panel 2 may be insulated with an insulating film or the like, the portion contacting the fastening pin 4. Furthermore, after the back panel 2 and the frame pipe 3 are joined to each other, the whole joint may be insulated by coating or the like with an insulating material. Or, an insulating material, for example, resin, may be used as a material forming the back panel 2.

Eighth Modification of First Embodiment

Figure 16:
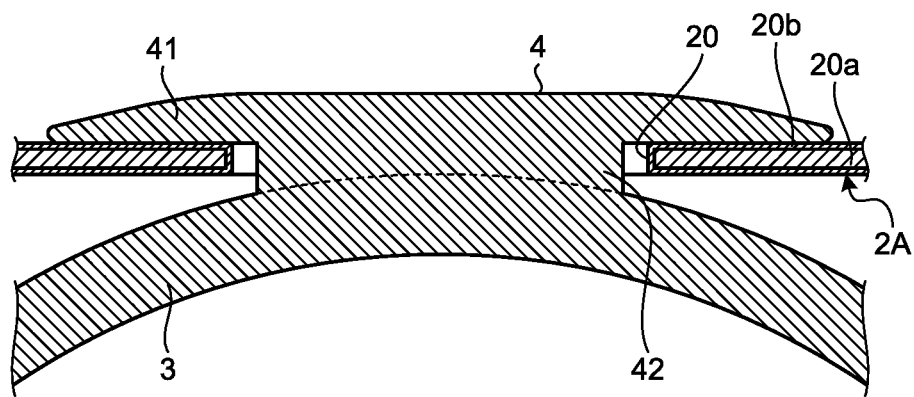
FIG. 16 is partial enlarged view of a back panel of an automobile seat frame according to an eighth modification of the first embodiment of the present invention.

FIG. 16 is a partial enlarged view of a back panel of an automobile seat frame according to an eighth modification of the first embodiment of the present invention. A back panel 2A according to this eighth modification has: a main body 20a made of an electrically conductive material, such as aluminum; and a coating 20b that covers a surface of the main body 20a and is insulative. The back panel 2A has the above described through holes 20 formed therein. Like the back panel 2A according to this eighth modification, the surface may be formed of an insulating material.

Ninth Modification of First Embodiment

Figure 17:
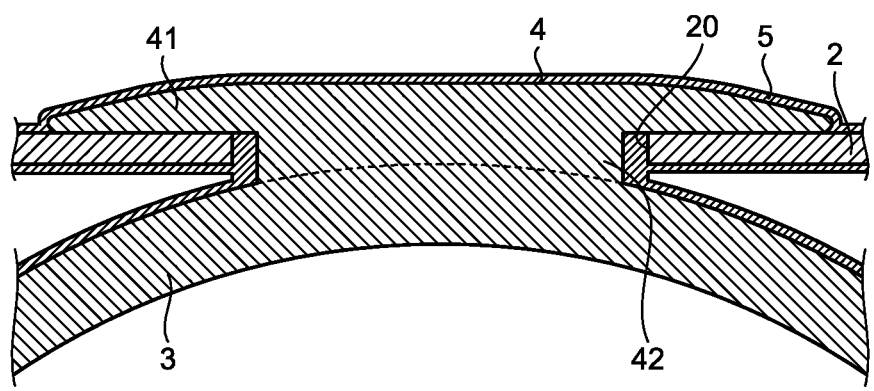
FIG. 17 is a partial enlarged view of a back panel of an automobile seat frame according to a ninth modification of the first embodiment of the present invention.

FIG. 17 is a partial enlarged view of a back panel of an automobile seat frame according to a ninth modification of the first embodiment of the present invention. In the automobile seat frame according to the ninth modification, an outer surface of a structure, which is formed of the above described back panel 2, frame pipe 3 and fastening pin 4, is coated with a coating 5 that is insulative. Like this automobile seat frame according to the ninth modification, an insulating coating may be provided over the entire outer surface of a seat frame.

Second Embodiment

Figure 18:
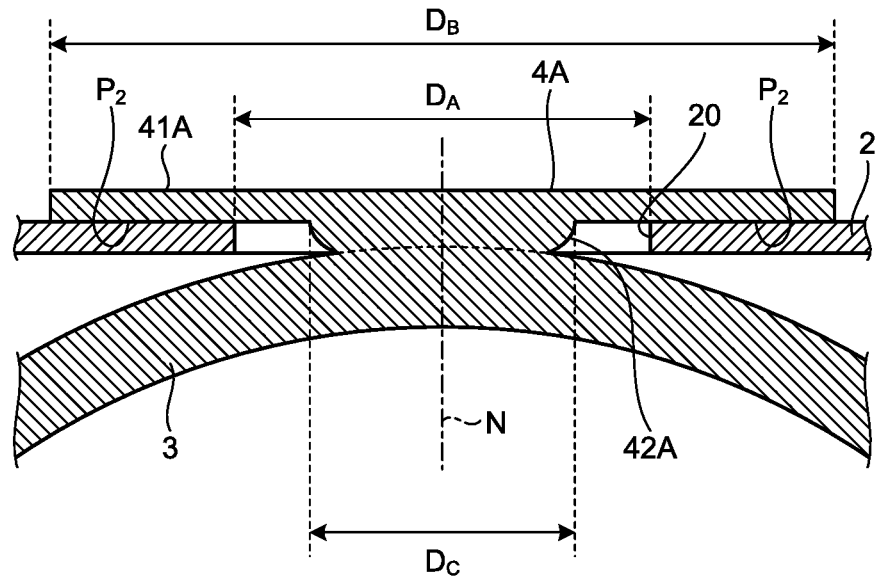
FIG. 18 is a partial enlarged sectional view of an automobile seat frame according to a second embodiment of the present invention.

FIG. 18 is a partial enlarged sectional view of an automobile seat frame according to a second embodiment of the present invention. The automobile seat frame according to the second embodiment includes: the above described back panel 2 and frame pipe 3, and a fastening pin 4A that fastens the back panel 2 and the frame pipe 3 together. Hereinafter, description of components (the back panel 2 and frame pipe 3) that are the same as those according to the above described first embodiment will be omitted.

The fastening pin 4A has a head portion 41A having a flat plate shape, and a protruding portion 42A provided at the center of the head portion 41A and protruding in a dome shape. The protruding portion 42A has a shape protruding in relation to a contact surface $P_2$ of the head portion 41, the contact surface $P_2$ contacting the back panel 2. The fastening pin 4A is formed by press working by use of a material that is the same as that of the frame pipe 3, for example, iron or iron-based alloy mentioned above. The protruding portion 42A of the fastening pin 4A is joined to the frame pipe 3 by welding. This welding is resistance spot welding mentioned above. The head portion 41A of the fastening pin 4A corresponds to a proximal portion.

Figure 19:
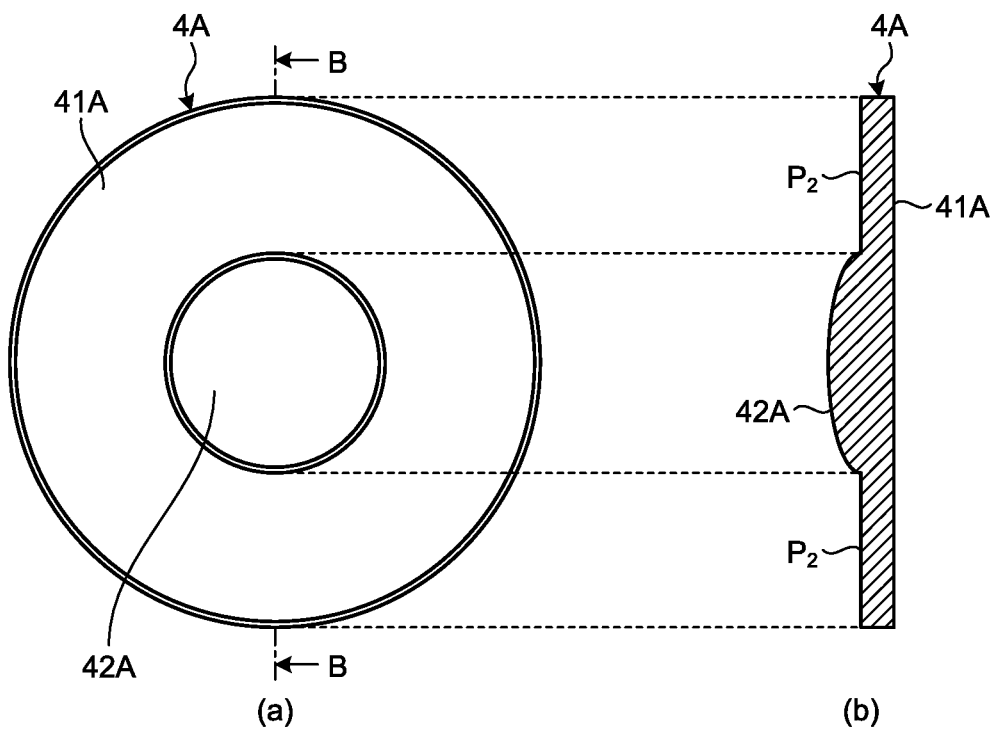
FIG. 19 is a diagram illustrating a configuration of a fastening pin of the automobile seat frame according to the second embodiment of the present invention.

FIG. 19 is a diagram illustrating a configuration of a fastening pin of the automobile seat frame according to the second embodiment of the present invention. In FIG. 19, (a) is a plan view of the fastening pin 4A as viewed in an axis N direction from a protruding portion 42A side. In FIG. 19, (b) is a sectional view taken along a line B-B illustrated in (a) of FIG. 19. Where the diameter of the through hole 20 of the back panel 2 is $D_A$, a diameter of the head portion 41A of the fastening pin 4A, the diameter being in a direction vertical to an axis N of the fastening pin 4A, is $D_B$, a diameter of the protruding portion 42A of the fastening pin 4A, the diameter being in the direction vertical to the axis N, is $D_C$, and the diameter of the frame pipe 3 is $D_D$, the diameters $D_A$ to $D_D$ have relations, $D_C < D_A < D_B$ and $D_A < D_D$. In a state where the frame pipe 3 and the fastening pin 4A have been joined to each other, the protruding portion 42A and the inner wall of the through hole 20 are separate from each other (see FIG. 18). Furthermore, the back panel 2 and the contact surface $P_2$ of the head portion 41A are in contact with each other.

According to the above described second embodiment, by resistance spot welding being performed in the state where the protruding portion 42A of the fastening pin 4A has been inserted through the through hole 20 of the back panel 2 and an end portion of the protruding portion 42A has abutted the frame pipe 3, the end portion being at a side opposite to a head portion 41A side of the protruding portion 42A, the automobile seat frame having the mechanically fastened frame pipe 3 and head portion 41A sandwiching the back panel 2 is able to be manufactured. According to the second embodiment, a plate-like member and a pipe-like member are able to be joined strongly to each other and weight reduction is enabled, by joining strength being ensured through reduction of generation of intermetallic compounds by means of resistance spot welding.

Furthermore, according to the second embodiment, by the head portion 41A being made plate-like, a surface confronting an electrode is planer, the shape of the electrode is thus not limited, and highly accurate positioning is thus not required either. Moreover, since the shape of the electrode is not limited, resistance spot welding is able to be performed by use of, for example, a highly durable electrode having a uniform diameter up to a distal end portion thereof.

Third Embodiment

Figure 20:
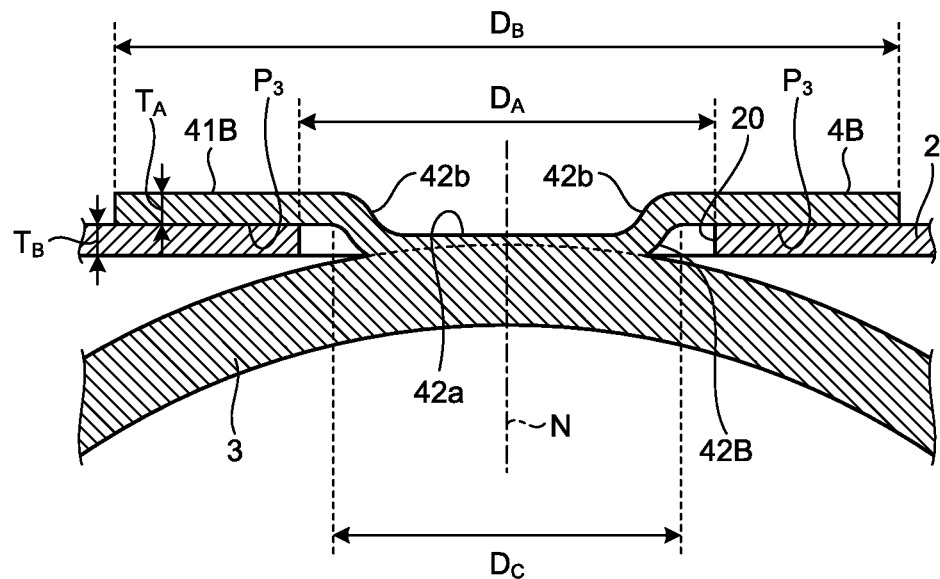
FIG. 20 is a partial enlarged sectional view of an automobile seat frame according to a third embodiment of the present invention.

FIG. 20 is a partial enlarged sectional view of an automobile seat frame according to a third embodiment of the present invention. The automobile seat frame according to the third embodiment includes: the above described back panel 2 and frame pipe 3, and a fastening pin 4B that fastens the back panel 2 and the frame pipe 3 together. Hereinafter, description of components that are the same as those of the above described first embodiment (the back panel 2 and frame pipe 3) will be omitted.

The fastening pin 4B is formed by press working by use of a material that is the same as that of the frame pipe 3, for example, iron or iron-based alloy mentioned above. The fastening pin 4B has a flange portion 41B having a hollow disc shape, and a protruding portion 42B that is provided on the inner circumference of the flange portion 41B and protrudes to one side in relation to the flange portion 41B. The protruding portion 42B has a shape protruding in relation to a contact surface $P_3$ of the flange portion 41B, the contact surface $P_3$ contacting the back panel 2. The protruding portion 42B has a flat plate portion 42a that is provided at a position offset from the flange portion 41B and has a flat shape, and a conoidal portion 42b extending to both the flange portion 41B and the flat plate portion 42a.

The fastening pin 4B has a uniform thickness. A ratio of a thickness $T_A$ of the fastening pin 4B to a thickness $T_B$ of the back panel 2 ($T_A/T_B$) preferably satisfies a relation, $1 \leq T_A/T_B \leq 1.35$.

The protruding portion 42B of the fastening pin 4B is joined to the frame pipe 3 by welding. This welding is resistance spot welding mentioned above. The flange portion 41B of the fastening pin 4B corresponds to a proximal portion.

Figure 21:
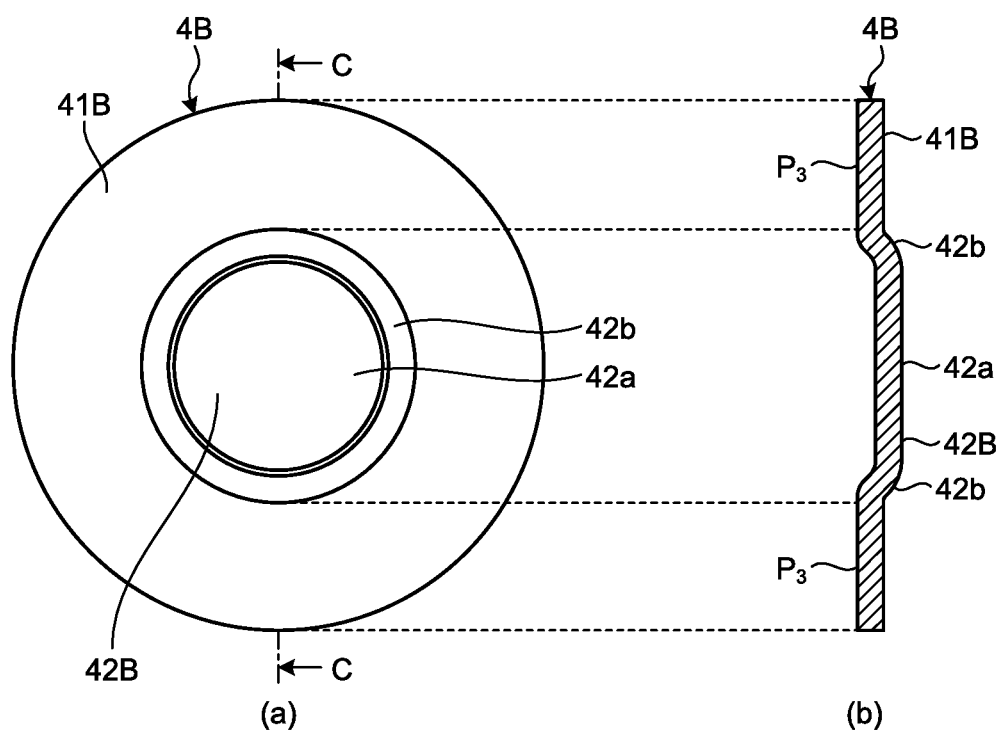
FIG. 21 is a diagram illustrating a configuration of a fastening pin of the automobile seat frame according to the third embodiment of the present invention.

FIG. 21 is a diagram illustrating a configuration of a fastening pin of the automobile seat frame according to the third embodiment of the present invention. In FIG. 21, (a) is a plan view of the fastening pin 4BA as viewed in an axis N direction from a protruding portion 42B side thereof. In FIG. 21, (b) is a sectional view taken along a line C-C illustrated in (a) of FIG. 21. Where the diameter of the through hole 20 of the back panel 2 is $D_A$, a diameter of the flange portion 41B of the fastening pin 4B, the diameter being in a direction vertical to an axis N of the fastening pin 4B, is $D_B$, a diameter of the protruding portion 42B of the fastening pin 4B, the diameter being in the direction vertical to the axis N, is $D_C$, and the diameter of the frame pipe 3 is $D_D$, the diameters $D_A$ to $D_D$ have relations, $D_C < D_A < D_B$ and $D_A < D_D$. In a state where the frame pipe 3 and the fastening pin 4B have been joined to each other, the protruding portion 42B and the inner wall of the through hole 20 are separate from each other (see FIG. 20). Furthermore, the back panel 2 and the contact surface $P_3$ of the flange portion 418B are in contact with each other.

Figure 22:
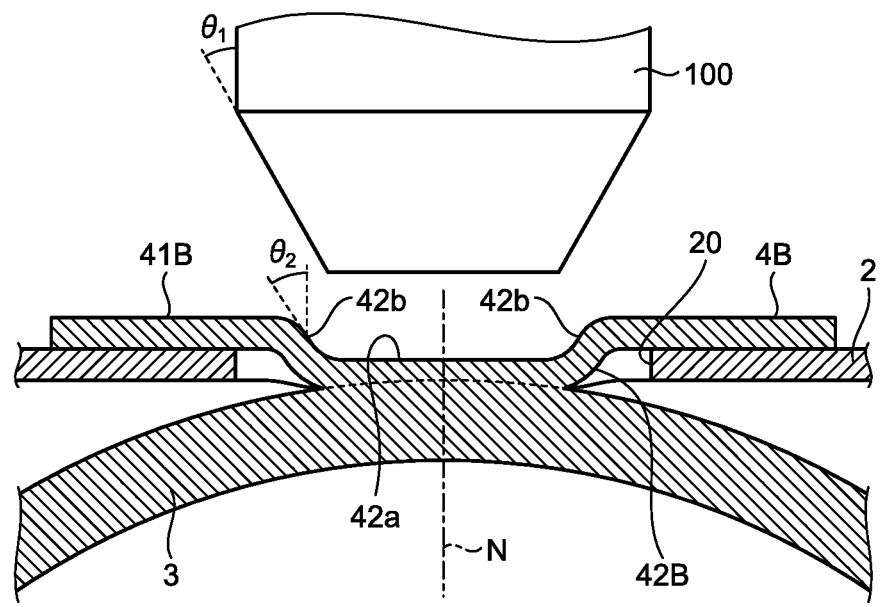
FIG. 22 is a diagram illustrating a joining method for the automobile seat frame according to the third embodiment of the present invention.

Next, a method of joining the fastening pin 4B and the frame pipe 3 to each other will be described by reference to FIG. 6A and FIG. 22. FIG. 22 is a diagram illustrating a joining method for the automobile seat frame according to the third embodiment of the present invention.

Firstly, correspondingly to these through holes 20, the frame pipe 3 is arranged on the back panel 2 having the through holes 20 formed therein beforehand (see FIG. 6A). After the frame pipe 3 is arranged on the back panel 2, the protruding portion 42B of the fastening pin 4B is inserted through the through hole 20, and caused to abut the frame pipe 3 (abutting step). In this state, positions of the frame pipe 3 and fastening pin 4B have been fixed by use of a jig not illustrated in the drawings, the positions being relative to the back panel 2. Before the arrangement of the frame pipe 3, the fastening pin 4B may be inserted through the through hole 20.

Thereafter, by the frame pipe 3 and the fastening pin 4B being sandwiched and electrified by two electrodes (only one electrode 100 of the two electrodes being illustrated in FIG. 22) in the radial direction of the frame pipe 3, resistance spot welding is performed (joining step), and a boundary portion where the frame pipe 3 and the fastening pin 4B abut each other is melt-solidified. A joined body as illustrated in FIG. 20 is thereby able to be obtained. Furthermore, by the resistance spot welding of the frame pipe 3 and fastening pin 4B that are made of the same material, generation of intermetallic compounds is able to be reduced.

The electrode 100 used in the resistance spot welding for welding of the frame pipe 3 and fastening pin 4B has a distal end that is planar and a side surface extending to the distal end, the side surface being conoidal, and an inclination angle $\theta_1$ of this conoidal side surface with respect to a central axis thereof in a longitudinal direction thereof is equal to or less than an inclination angle $\theta_2$ of the conoidal portion 42b with respect to the axis N of the fastening pin 4B. The distal end plane of the electrode 100 and the flat plate portion 42a thereby oppose each other, and electric current is able to be caused to flow efficiently between the frame pipe 3 and the flat plate portion 42a.

According to the above described third embodiment, by resistance spot welding being performed in the state where the protruding portion 42B of the fastening pin 4B has been inserted through the through hole 20 of the back panel 2 and an end portion of the protruding portion 42B has abutted the frame pipe 3, the end portion being at a side opposite to a flange portion 41B side thereof, the automobile seat frame having the mechanically fastened frame pipe 3 and flange portion 41B sandwiching the back panel 2 is able to be manufactured. According to the third embodiment, a plate-like member and a pipe-like member are able to be joined strongly to each other and weight reduction is enabled, by joining strength being ensured through reduction of intermetallic compounds by means of resistance spot welding.

Furthermore, according to the above described third embodiment, weight reduction is enabled more as compared to the above described fastening pins 4 and 4A according to the first and second embodiments, and since the fastening pin 4B has a shape easily formable by pressing, the fastening pin 4B is able to be manufactured inexpensively.

A configuration according to any of the above described first to ninth modifications of the first embodiment is applicable to the second or third embodiment.

As described above, the present invention may include various embodiments and the like not described herein, and various design changes and the like may be made without departing from the technical ideas identified by the claims. In this specification, examples of automobile seat frames have been described, but for example, a joined body, which is manufactured by resistance spot welding of a hollow pipe made of iron or iron alloy and a fastening pin having a proximal portion and a protruding portion by use of a thin plate made of aluminum or aluminum alloy, the hollow pipe, and the fastening pin, may be applied to a product that is not an automobile seat frame. Furthermore, the thin plate, and the hollow pipe and fastening pin are not limited to the combination of aluminum and iron, and any material having a specific gravity smaller than that of the material forming the hollow pipe and fastening pin may be used for the thin plate. For example, if the material forming the hollow pipe and fastening pin is iron: resin, such as polypropylene, or carbon fiber reinforced plastic (CFRP); alloy having titanium as a main component; alloy having magnesium as a main component; or the like may be used for the thin plate.

EXAMPLES

Described hereinafter are examples of an automobile seat frame according to the present invention. The present invention is not limited to these examples.

First Example

Figure 23:
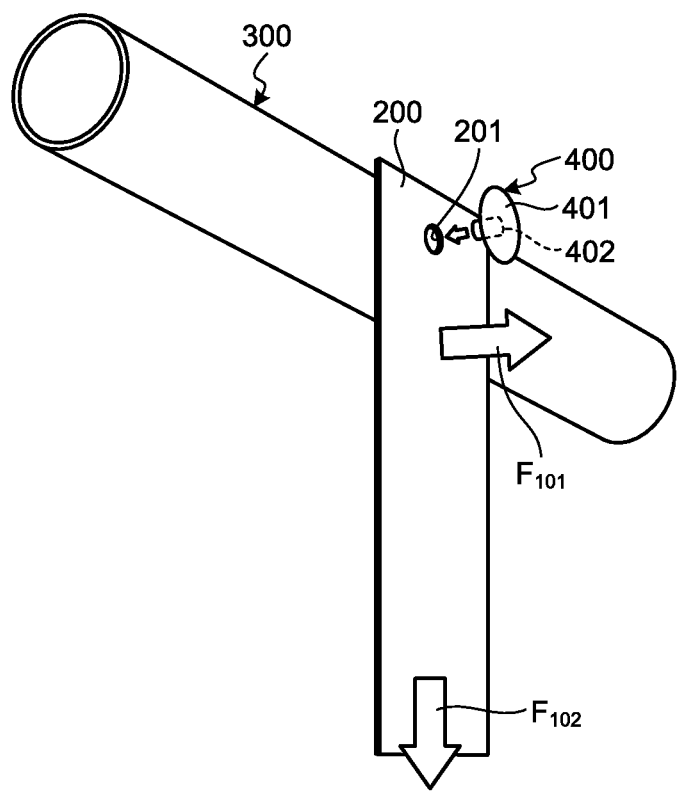
FIG. 23 is a diagram illustrating a configuration of a test piece in an example of the present invention.

FIG. 23 is a diagram illustrating a configuration of a test piece according to an example of the present invention. A joined body as illustrated in FIG. 23 was manufactured as a test piece by resistance spot welding where the electric current value was 4.0 kA and the welding force of the fastening pin 400 with respect to the frame pipe 300 was 2.5 kN, by use of: an aluminum panel 200 (corresponding to the back panel 2) made of an aluminum alloy (A5182), having a through hole 201 with a diameter of 4.0 mm, and having a cation-coated surface; a frame pipe 300 (an electric resistance welding carbon steel pipe for an automobile structure (SIAM): corresponding to the frame pipe 3) having a tensile strength of about 1470 MPa; and a fastening pin 400 (corresponding to the fastening pin 4) having a head portion 401 with a diameter of 15.0 mm. The fastening pin 400 has the head portion 401 having a flat plate shape, and a shaft portion 402 extending cylindrically from a central portion of the head portion 401. A diameter of the shaft portion 402 of the fastening pin 400 is smaller than the diameter of the through hole 201.

Second Example

A test piece according to Second Example is the same as that according to First Example, except that the diameter of the through hole 201 was changed to 6.0 mm. In Second Example, resistance spot welding was performed with the electric current value set at 6.0 kA.

Third Example

A test piece according to Third Example is the same as that according to First Example, except that the diameter of the through hole 201 was changed to 8.0 mm. In Third Example, resistance spot welding was performed with the electric current value set at 8.0 kA.

First Comparative Example

A test piece according to First Comparative Example is the same as that according to First Example, except that: a fastening pin and a frame pipe were joined to each other by resistance spot welding where the electric current value was 13 kA and the welding force of the fastening pin with respect to the frame pipe was 1.9 kN, after the fastening pin was caused to penetrate an aluminum panel by pressing where the force applied by the fastening pin to the aluminum panel was 4.2 kN.

Figure 24A:
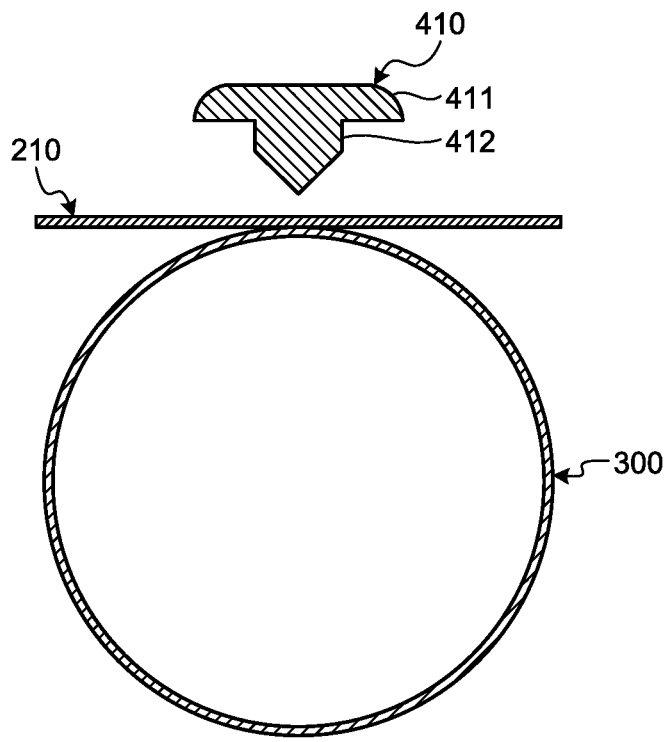
FIG. 24A is a diagram illustrating (a first part of) a joining method for a test piece according to a comparative example for the present invention.
Figure 24B:
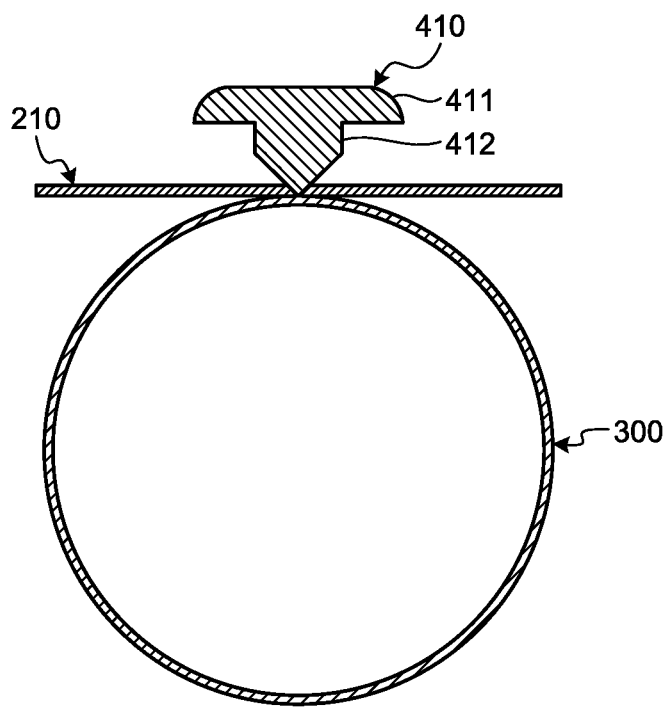
FIG. 24B is a diagram illustrating (a second part of) the joining method for the test piece according to the comparative example for the present invention.
Figure 24C:
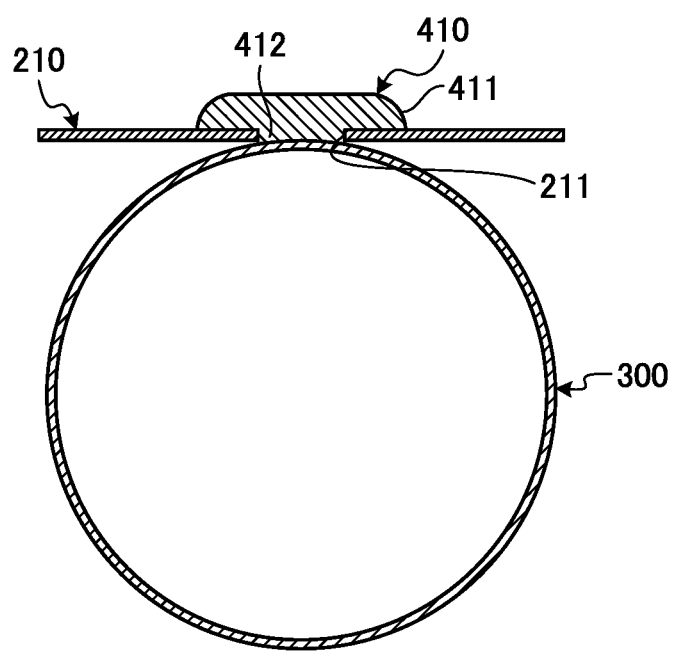
FIG. 24C is a diagram illustrating (a third part of) the joining method for the test piece according to the comparative example for the present invention.

A method of joining the fastening pin and the frame pipe to each other according to First Comparative Example will be described by reference to FIG. 24A to FIG. 24C. FIG. 24A to FIG. 24C are diagrams illustrating a joining method for the test piece according to First Comparative Example for the present invention. A back panel 210 according to First Comparative Example does not have any through holes formed therein. Furthermore, a fastening pin 410 has a head portion 411 having a flat plate shape, and a shaft portion 412 extending cylindrically from a central portion of the head portion 411; and an end portion of the shaft portion 412 has a tapered shape, the end portion being at a side opposite to a head portion 411 side of the shaft portion 412.

Firstly, as illustrated in FIG. 24A, the frame pipe 300 is arranged on the back panel 210 not having any through holes formed therein beforehand. After the frame pipe 300 is arranged on the back panel 210, as illustrated in FIG. 24B, the shaft portion 412 of the fastening pin 410 is caused to pierce the back panel 210, and a distal end of the shaft portion 412 is caused to abut the frame pipe 300. Before the frame pipe 300 is arranged, the fastening pin 410 may be caused to penetrate the back panel 210.

Thereafter, by the frame pipe 300 and the fastening pin 410 being sandwiched by two electrodes and electricity being conducted therethrough, resistance spot welding is performed, and a boundary portion where the frame pipe 300 and the fastening pin 410 abut each other is melt-solidified. A joined body as illustrated in FIG. 24C is thereby able to be obtained, the joined body having the shaft portion 412 having been press-fitted in a through hole 211 formed in the back panel 210, the shaft portion 412 having been joined to the frame pipe 300. The joined body according to First Comparative Example is in a state where the back panel 210 and the shaft portion 412 are in contact with each other, that is, a state where there is no gap between the back panel 210 and the shaft portion 412.

Figure 25:
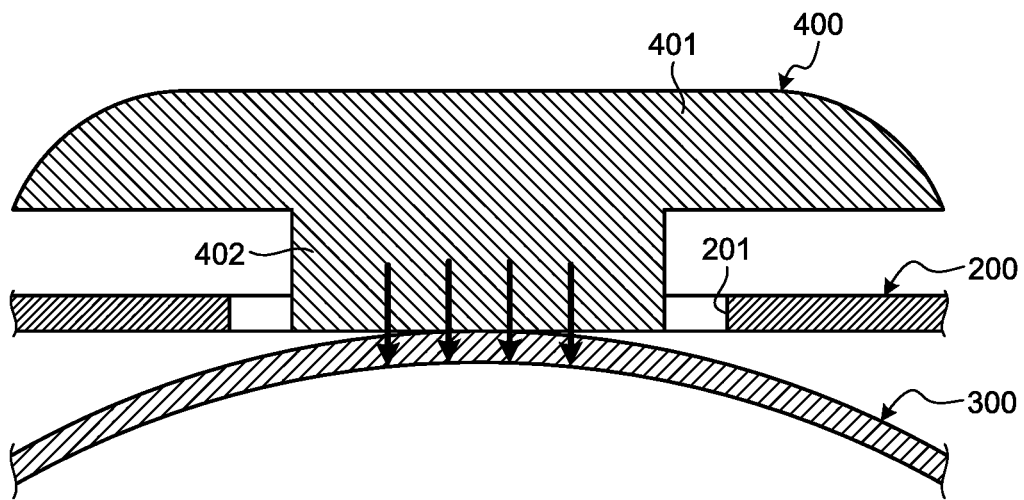
FIG. 25 is a diagram illustrating joining for a test piece according to an example of the present invention.
Figure 26:
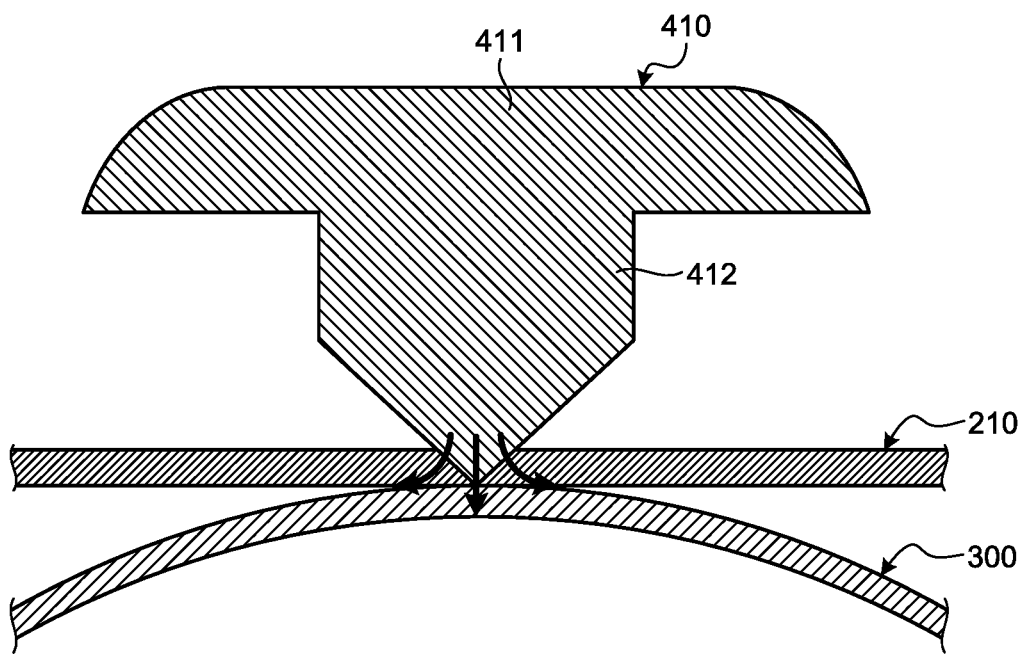
FIG. 26 is a diagram illustrating joining for a test piece according to a comparative example for the present invention.

FIG. 25 is a diagram illustrating joining for the test pieces according to the examples of the present invention. FIG. 26 is a diagram illustrating joining for the test piece according to the comparative example for the present invention. Arrows in FIG. 25 and FIG. 26 indicate flow of electric current. Since the fastening pin corresponding to the fastening pin 4 as illustrated in FIG. 5 is used in the above described configurations according to First to Third Examples, areas of melting in the frame pipe 300 and fastening pin 400 (shaft portion 402) in the spot welding are able to be ensured (see FIG. 25). On the contrary, in the configuration according to First Comparative Example, since only the distal end of the shaft portion 412 is in contact with the frame pipe 300, the area of melting at the start of welding is smaller than those in First to Third Examples. In First Comparative Example, the area of the melted portion is gradually increased (see FIG. 26).

Figure 27:
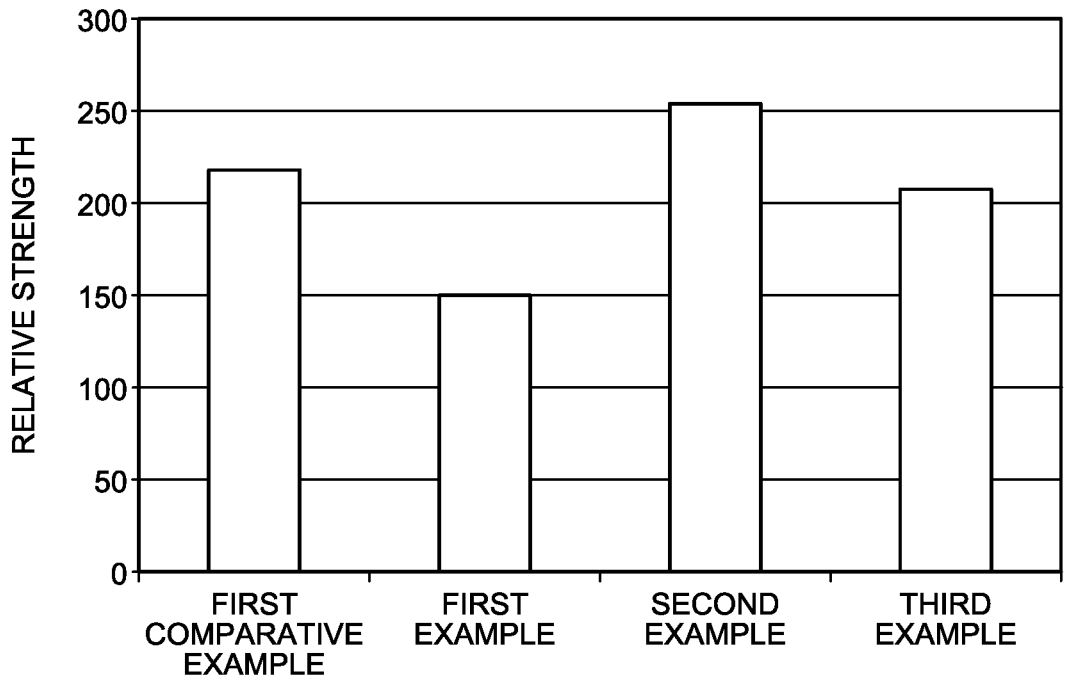
FIG. 27 is a diagram illustrating results of peeling tests for examples of the present invention.

Peeling tests were performed for First to Third Examples and First Comparative Example. In the peeling tests, peeling load $F_{101}$ illustrated in FIG. 23 was gradually increased, and peeling withstanding loads at which the test pieces were broken were measured. In the peeling tests, three test pieces were prepared for each of the examples, the peeling withstanding load was measured three times, and an average value thereof was calculated. Results having the average values normalized, with a peeling strength sufficient for a seat frame being set at 100 in these peeling tests, are illustrated in FIG. 27. As a result of the peeling tests, the peeling strength (relative strength) of First Example was 150, the peeling strength (relative strength) of Second Example was 254, and the peeling strength (relative strength) of Third Example was 206. In contrast, the peeling strength (relative strength) of First Comparative Example was 218.

Figure 28:
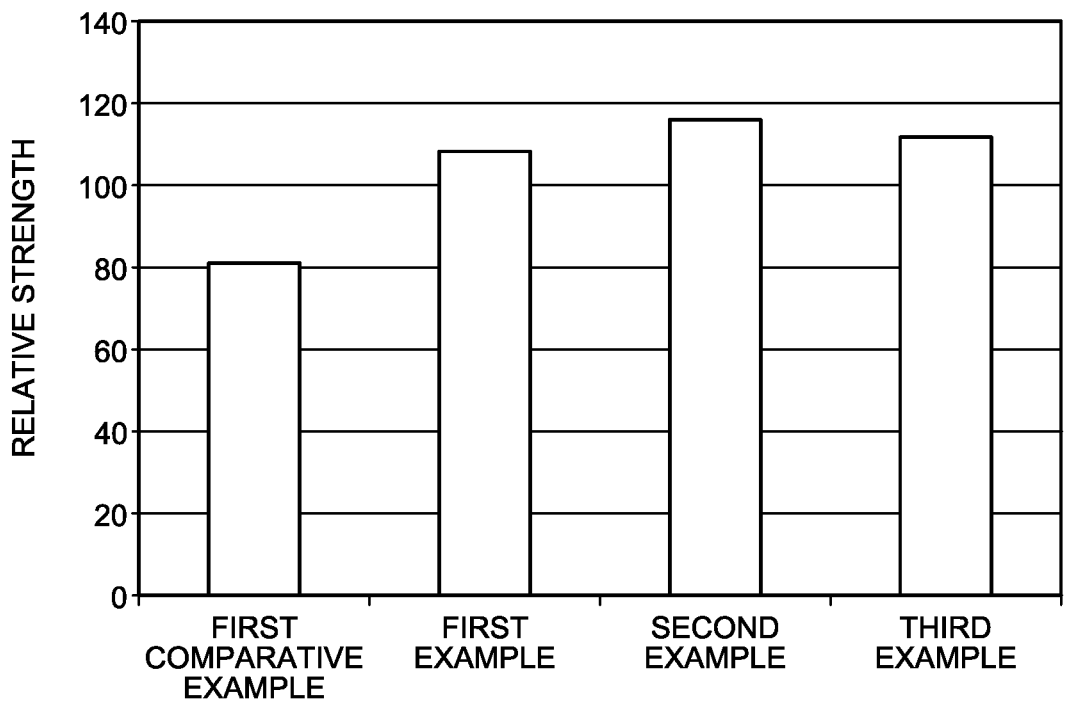
FIG. 28 is a diagram illustrating results of shearing tests for the examples of the present invention.

Furthermore, shearing tests were performed for First to Third Examples and First Comparative Example. In the shearing tests, shearing load $F_{102}$ illustrated in FIG. 23 was gradually increased, and shearing withstanding loads at which the test pieces were broken were measured. In the shearing tests, three test pieces were prepared for each of the examples, the peeling withstanding load was measured three times, and an average value thereof was calculated. Results having the average values normalized, with a shearing strength sufficient for a seat frame being set at 100 in these shearing tests, are illustrated in FIG. 28. As a result of these shearing tests, the shearing strength (relative strength) of First Examples was 108.5, the shearing strength (relative strength) of Second Example was 116, and the shearing strength (relative strength) of Third Example was 111. In contrast, the shearing strength (relative strength) of First Comparative Example was 82. From the shearing tests, as illustrated in FIG. 28, it is understood that while First to Third Examples had sufficient shearing withstanding loads, the shearing strength of First Comparative Example was low.

INDUSTRIAL APPLICABILITY

As described above, a joined body, an automobile seat frame, and a joining method, according to the present invention, enable a plate-like member and a pipe-like member to be joined strongly to each other, and are suitable for weight reduction.

REFERENCE SIGNS LIST

1 AUTOMOBILE SEAT FRAME
2, 2A BACK PANEL
3 FRAME PIPE
4, 4A, 4B FASTENING PIN
5, 20b COATING
20, 21, 22 THROUGH HOLE
20a MAIN BODY
41, 41A HEAD PORTION
41B FLANGE PORTION
42 SHAFT PORTION
42A, 42B PROTRUDING PORTION
42a FLAT PLATE PORTION
42b CONICAL PORTION

The invention claimed is:
1. A joined body comprising:
a thin plate including through holes formed along an outer periphery thereof;
a first member including
a proximal portion having a portion contacting the thin plate, and
a protruding portion that protrudes in relation to a contact surface of the proximal portion and is inserted through the through hole, the contact surface contacting the thin plate; and
a second member arranged oppositely to the proximal portion via the thin plate and made of a material that is same as that of the first member, wherein
the thin plate is made of a material having a specific gravity smaller than that of the material forming the first member and the second member,
the second member and an end portion of the protruding portion are connected to each other, by a part of the second member and a part of the end portion being melt-solidified, the end portion being at a side opposite to a side connected to the proximal portion,
a relationship represented by $D_C < D_A < D_B$ is satisfied, where a size of the through holes is $D_A$, a size of the proximal portion is $D_B$, and a size of the protruding portion is $D_C$, and
the protruding portion and an inner wall of the through hole are separated in a state where the second member and the first member have been joined to each other.
2. The joined body according to claim 1, wherein at least a surface of the thin plate is formed of an insulating material.
3. The joined body according to claim 1, wherein a surface of the joined body includes an insulating coating formed thereon.
4. The joined body according to claim 1, wherein
the thin plate is made of aluminum or aluminum alloy, and
the second member and the first member are made of iron or iron alloy.

5. An apparatus comprising an automobile seat frame including a joined body, the joined body comprising:
- a thin plate including through holes formed along an outer periphery thereof;
- a first member including
  - a proximal portion having a portion contacting the thin plate, and
  - a protruding portion that protrudes in relation to a contact surface of the proximal portion and is inserted through the through hole, the contact surface contacting the thin plate; and
- a second member arranged oppositely to the proximal portion via the thin plate and made of a material that is same as that of the first member, wherein
- the thin plate is made of a material having a specific gravity smaller than that of the material forming the first member and the second member,
- the second member and an end portion of the protruding portion are connected to each other, by a part of the second member and a part of the end portion being melt-solidified, the end portion being at a side opposite to a side connected to the proximal portion,
- a relationship represented by $D_C < D_A < D_B$ is satisfied, where a size of the through holes is $D_A$, a size of the proximal portion is $D_B$, and a size of the protruding portion is $D_C$, and
- the protruding portion and an inner wall of the through hole are separated in a state where the second member and the first member have been joined to each other.

6. A joining method comprising:
- an abutting step of:
  - inserting protruding portions of first members each including a proximal portion and a protruding portion protruding in relation to the proximal portion, respectively through the through holes formed in a thin plate made of a material having a specific gravity smaller than that of a material forming the first members; and
  - causing end portions of the protruding portions to abut a second member made of a material that is same as that of the first member, the end portions being at sides opposite to sides connected to the proximal portions; and
- a joining step of joining parts of the second member with parts of the end portions of the protruding portions by resistance spot welding in a state where the second member has abutted the end portions of the protruding portions, the end portions being at the sides opposite to the sides connected to the proximal portions, wherein
- a relationship represented by $D_C < D_A < D_B$ is satisfied, where a size of the through holes is $D_A$, a size of the proximal portion is $D_B$, and a size of the protruding portion is $D_C$, and
- the protruding portion and an inner wall of the through hole are separated in a state where the second member and the first member have been joined to each other.

* * * * *